P. F. VALERIO.
FILM SHIFT LOCK FOR CAMERAS.
APPLICATION FILED JUNE 30, 1919.
1,400,641.
Patented Dec. 20, 1921.
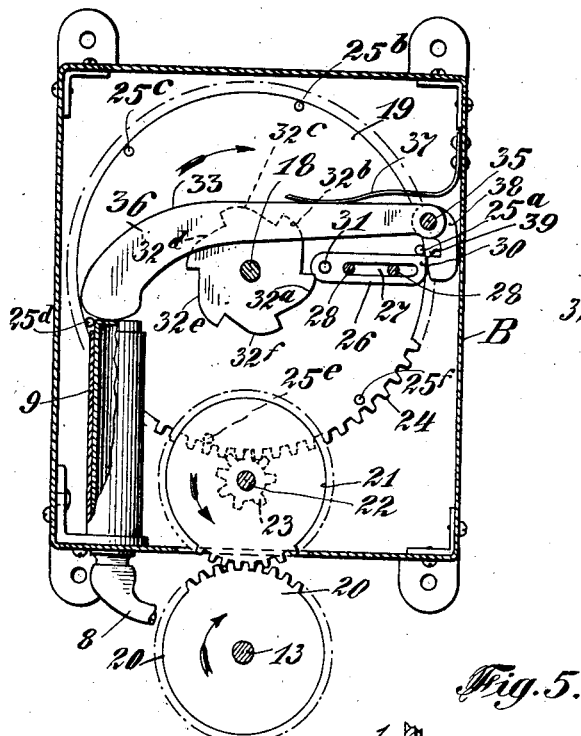
Fig. 2.
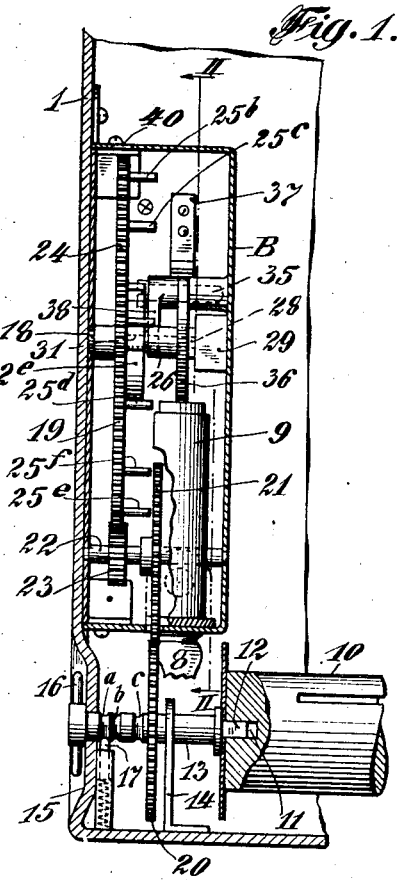
Fig. 1.
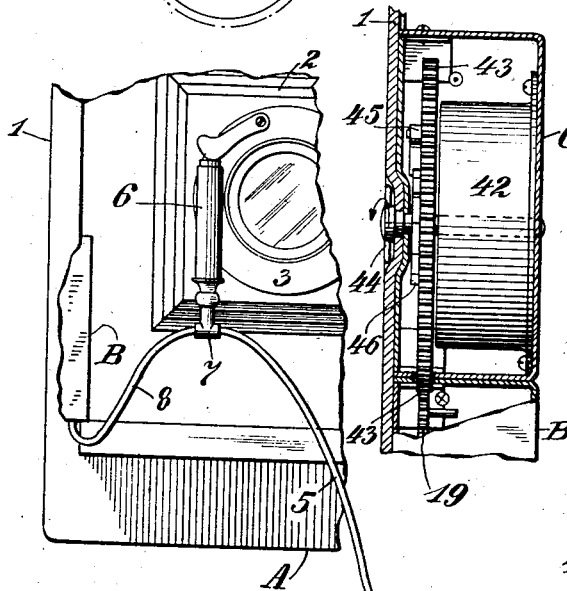
Fig. 5.
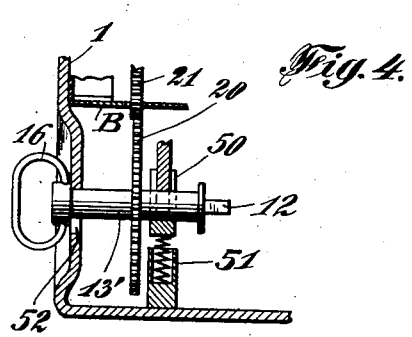
Fig. 4.
Fig. 3.
Inventor
P. F. Valerio
By Howard Day
his Attorney

UNITED STATES PATENT OFFICE.

PIETRO F. VALERIO, OF NEW YORK, N. Y.

FILM-SHIFT LOCK FOR CAMERAS.

1,400,641.	Specification of Letters Patent.	Patented Dec. 20, 1921.

Application filed June 30, 1919. Serial No. 307,648.

*To all whom it may concern:*

Be it known that I, PIETRO F. VALERIO, a subject of the King of Italy, and a resident of New York city, county, and State of New York, have invented certain new and useful Improvements in Film-Shift Locks for Cameras, set forth in the following specification.

This invention relates to film cameras. In the ordinary camera of this type there is no coördination between the operation of the shutter and the position of the film. Obviously, for each photographic manipulation of a shutter, a new stretch of film of an extent corresponding to an exposure must be moved into position opposite the shutter. Ordinarily in a camera of this type, a window opening in the camera structure makes visible a numbered marker on the shiftable film, which may be wound progressively after each exposure manipulation of a shutter until the proper numbered marker is visible through the window. In this manipulation the sight of the operator must be concentrated upon the window opening, which is especially vexatious and disadvantageous when a series of exposures of the same moving object is desired. Often times the object is lost sight of or at least the aim of the camera is destroyed.

One object of the present invention is to insure the proper shifting of a film solely by the sense of touch, that is, merely by a simple winding movement. A still further object of the invention is to accomplish the desired shifting of the film for a new exposure automatically or semi-automatically, either in response to and after a complete exposure operation of the shutter or conceivably in response merely to release of some simple releasing mechanism.

In carrying out the object of the invention it is proposed to provide two locking means for the film, the first a latch normally locking the winding of the film, and the second a catch operative to release the first latch and itself act as a substitute for the same until the completion of an exposure operation of the shutter.

Further objects of the invention are to provide a touch controllable measuring device for the shifting of a photographic film which may be applied to a camera of standard construction as an attachment thereto.

The above will better be understood by the embodiments of the invention disclosed, in the accompanying drawings and specification, solely for purposes of illustration and in explanation of the claims, which designate the true scope thereof.

In the accompanying drawings, which form a part hereof,

Figure 1 is a vertical section taken through a camera embodying my locking and measuring mechanism, with parts shown in elevation and parts broken away;

Fig. 2 is a section through line II—II of Fig. 1, looking toward the left and with parts shown in elevation;

Fig. 3 is a fractional front elevation of a camera showing the manually operated mechanism for both the shutter and the locking mechanism;

Fig. 4 is a fractional vertical section showing a modification of the clutch release for the film winding shaft; and Fig. 5 is a vertical section drawn to a reduced scale showing the application of a spring motor for rendering the operation of the mechanism automatic.

The camera A is shown comprising the usual casing 1 and plaited bellows 2 carrying the shutter 3. The shutter operating mechanism illustrated comprises the compression bulb 4, flexible tube 5 connected to the cylinder and piston 6 through a T-union 7, from which T-union tubular extension 8 extends to the lock operating cylinder and piston 9. The cylinders and pistons 6 and 9, operated by the bulb 4, are intended to be illustrative of any equivalent mechanism which has a part capable of being thrust out and releasably returned to normal position when the manually operated part such as the bulb returns to its normal position, which in the case of the bulb is to a position of complete inflation, which it does due to its inherent resilience.

10 is the usual winding spool of a camera of this type having the usual wing slot 11 to be releasably engaged by the wing pin 12. In the mechanism of Figs. 1, 2, 3 and 5 the film winding shaft 13, on the end of which is affixed the wing pin 12, is mounted for axial movement in the bearings 14 and 15 and may be manually operated by the finger bail 16. Annular grooves $a$, $b$, $c$ in the shaft 13, coöperating with the spring snap 17, determine the axial position of the winding shaft.

A frame B may be suitably mounted as by screws upon the inner wall of the camera casing 1. In this frame B is mounted a spindle 18 carrying the lock wheel 19 which is suitably geared to the winding shaft 13. In the embodiment illustrated, the gear 20 is fixed to the winding shaft 13 which normally meshes with the gear 21, to the spindle 22 of which is fixed a pinion 23 meshing with gear teeth 24 of a gear conveniently formed on the periphery of the lock wheel 19, although it is functionally merely coaxially fixed relatively thereto.

Angularly spaced about and fixed at the same radial positions upon the lock wheel 19 are a number of detents shown in the form of pins $25^a$, $25^b$, $25^c$, $25^d$, $25^e$ and $25^f$, which correspond in number to the number of exposures to be provided on the film employed. The angular spaces between adjacent pins correspond progressively with the angular turning of the winding shaft 13 required to shaft the film exactly an exposure space or, for that matter, will correspond to any predetermined shift of the film. As a fewer number of turns of the winding spool 10 are required when the spool is nearly full, the space between pins $25^b$ and $25^c$, etc., is greater than the space between pins $25^a$ and $25^b$.

A dead beat latch 26 has a slot 27 which slidably guides the latch on pins 28 fixedly mounted on block 29. The normal position of the latch is such that its nose 30 is in the path of the pins $25^a$, etc. At the other end of the latch 26 is a pin 31 coöperating with cams $32^a$, $32^b$, etc., which correspond to the spaces preceding each of the pins $25^a$, $25^b$, etc.

A bell-crank lever 33 is suitably fulcrumed in the frame B by the stud 35 and is shaped so that its arm 36 is normally spring pressed against the piston of the cylinder and piston 9 by suitable means such as the spring 37. The other arm 38 of the lever 33 carries a catch 39 corresponding in position with the nose 30 of the latch 26 and movable into the path of the pins $25^a$, etc.

The frame B is preferably provided with a knock-out portion 40 to give access to the gear 24. If desired a spring motor C may be employed. In this motor the spring box is indicated by 42 and serves to drive the gear 43. The spring may be wound by the key 44, the usual pawl and ratchet 45 and 46 for the gear 43 being provided. When the spring motor C is employed, it may be mounted at the end of the frame B upon the inner wall of the camera casing, so that the gear 43 meshes with the gear 24 or, if desired, the casing of the spring motor and frame B may be combined.

*Operation.*

The end of the film is threaded into the usual slot of the winding spool 10. The winding shaft 13 is pulled out so that the stop 17 engages in the groove $b$ so that the gear 20 releases or goes out of mesh with the gear 21, thus operating as a clutch. The film is then wound up by operating the bail or key 16 until the starting position for the film has been reached. The winding shaft 13 is then snapped in so that the stop 17 occupies the groove $a$, and so that the gear 20 meshes with the gear 21. When threading the spool 10 the winding shaft 13 may be retracted until the stop 17 occupies the groove $c$, which is sufficient retraction to release the wing pin 12 from the wing slot 11, while retraction only enough to cause the groove $b$ to be engaged by the stop 17 is not sufficient to disengage the wing pin and wing slot.

When the mechanism is set, a non-exposing trial manipulation of the shutter operating mechanism may be made to permit or to cause a shift of the film to present the extent ready for the first exposure. This initial operation is the same as the operation after each exposure, which for convenience will be described as follows:

The shutter operating mechanism is operated, that is, the bulb 4 is squeezed. In response, an actuation of the shutter 3 to expose the film takes place, either for a snapshot or for a time exposure, according to the setting of the shutter 3. At the same time the piston 9 operates to move the bell-crank lever 33 against its spring 37. The catch 39 butts the latch 26 to the left, as shown in Fig. 2, the pin 31 clearing the cam $32^a$ and the nose 30 clearing the pin or detent $25^a$. The catch 39, however, replaces the nose 30 in the path of the detent $25^a$ so that the lock wheel 19 still remains locked. Upon the release of the shutter operating mechanism, that is, upon the release of the bulb 4 in the embodiment shown the spring 37 returns the bell-crank lever 33 to normal position so that the catch 39 releases the detent $25^a$. By turning the winding key 16 the film may then be shifted without regard to the exact amount until it is positively stopped. As the film is wound up the gears are operated to rotate the lock wheel 19 and its attached cams $32^a$, etc. The cam $32^b$ engages the pin 31 and drives the latch 26 to the right, as shown in Fig. 2, into the path of pin $25^b$ which, when it engages the nose of the latch 26, is locked against further movement. Thus there is no need of watching the window opening for a sight indication of a shift of the film. In the event a spring motor is employed, this shift of the film is automatic. In any event, it may be accomplished by a manipulation of the key 16 whether or not the spring motor is in operation.

It should be noted that the film is locked against winding only after a fresh exposure space has been moved into position. Thus the fact that it is locked, easily determined by an attempt to turn the key 16, is a positive touch memory reminder that an exposure may safely be made.

In Fig. 4 a floating bearing 50, normally upwardly spring pressed by the spring 51, is provided for the winding shaft 13', which is free to move downwardly in the casing 1 by the provision of a slot 52. In this manner the gear 20 may be disengaged from the gear 21 in a modified manner. The movement of the winding shaft is so slight that the initial threading winding may be accomplished without trouble.

What I claim and desire to secure by United States Letters Patent is:—

1. A film-camera comprising a film winding shaft; a lock-wheel geared to said shaft; said lock-wheel carrying locking detents angularly spaced to correspond to predetermined shifts of the film; a dead beat latch movable into and out of the path of said detents; a resiliently retracted catch operable to butt said latch out of the path of said detents and itself to replace said latch in said path of said detents; a cam operatively positioned to replace said latch in the path of said detents when said lock wheel shifts the angular space between adjacent detents; a shutter; manually operable shutter operating mechanism having a bias to normal position; and an operative connection between said shutter operating mechanism and said catch to move the same against its resilient retraction to release said latch upon the operation of said shutter operating mechanism and to permit the retraction of said catch upon the return to normal of said shutter operating mechanism whereby the film is normally locked in fixed position but is released to be shifted only a predetermined distance only after said shutter operating mechanism has been operated and has returned to normal and whereby said film is again locked after being shifted said predetermined distance.

2. A film-camera comprising a film winding shaft; a lock-wheel geared to said shaft; a spring motor tending operatively to drive said lock wheel and said film winding shaft; said lock-wheel carrying locking detents angularly spaced to correspond to predetermined shifts of the film; a dead beat latch movable into and out of the path of said detents; a resiliently retracted catch operable to butt said latch out of the path of said detents and itself to replace said latch in said path of said detents; a cam operatively positioned to replace said latch in the path of said detents when said lock wheel shifts the angular space between adjacent detents; a shutter; manually operable shutter operating mechanism having a bias to normal position; and an operative connection between said shutter operating mechanism and said catch to move the same against its resilient retraction to release said latch upon the operation of said shutter operating mechanism and to permit the retraction of said catch upon the return to normal of said shutter operating mechanism, whereby the film is normally locked in fixed position but is released to be shifted automatically only a predetermined distance only after said shutter operating mechanism has been operated and has returned to normal and whereby said film is again locked after being shifted said predetermined distance.

3. A film-camera comprising a film winding shaft adapted to removably mount and drive a removable film-winding spool; a rotatable film measuring lock-member having detents angularly spaced to measure exposure shifts of the film through the angle of rotation of said shaft but compensating for the increasing diameter of the film wound upon said spool; reduction gearing connecting said shaft with said lock-member and including a releasable clutch to permit when necessary the operation of said shaft independently of said lock member for adjusting the position of said film through the medium of said removable spool; latch and catch mechanism for locking and releasing one detent at a time of said lock member and requiring two actuations, one for the latch mechanism and one for the catch mechanism; shutter mechanism; and a combined pressure applying means for operating both said shutter mechanism and said latch and catch mechanism simultaneously to effect the release of one of said detents after a release of pressure by said pressure applying means.

In witness whereof I have signed my name to this specification, this 12 day of June, 1919.

P. F. VALERIO.